Patented Nov. 10, 1953

2,658,830

UNITED STATES PATENT OFFICE 2,658,830

METHOD FOR MAKING CONFECTIONS

Paul E. Schultz, Wichita, Kans.

No Drawing. Application March 17, 1952,
Serial No. 277,085

2 Claims. (Cl. 99—134)

This invention relates to a method for making confections. In one aspect it relates to a method for making confections having liquid or soft centers. In another aspect it relates to a method for making confections having centers of predetermined consistency. In still another aspect the invention relates to a method for making a confection having a center which is soft or liquid at ordinary temperatures but which is firm and easily handled during the coating stage of making a confection.

In one embodiment of my invention, finely ground ice is admixed with sugar and other dry ingredients forming the confectionery center and the resulting mixture is compressed to form a confectionery center of a desired shape and size, the temperature during the admixing and compressing being maintained below the melting point of the ice. When the center has been formed as described, it can be further treated by conventional means such as coating with chocolate to form a chocolate-covered confection. After the coating has been applied, the temperature of the center is allowed to rise so as to melt the ice and thereby form a liquid or soft centered confection.

It has long been the practice in making confections having soft or liquid centers, known in the art as cordials, to prepare the centers at the desired consistency, pour the mixture into chocolate molds, and then seal the molds to form the finished confections. Syrup filled paraffin items are also prepared in this manner. Such a procedure is expensive, inefficient, not adapted to mass production application, difficult to execute, and produces a confection of inferior quality. Also the consistency of the center of the finished confection cannot be accurately controlled, and, in many instances, it is necessary to subject the confection to a prolonged curing period before it is ready for consumption. Much time and effort has been expended in an attempt to overcome these difficulties and undesirable features encountered in present methods, but to date, no satisfactory solution has been obtained.

The difficulties encountered in methods utilized in the prior art are avoided by the practice of my invention wherein the dry ingredients contained in the center of the confection are intimately mixed with finely ground ice and the resulting mixture is pressed into a solid center which can then be subjected to coating methods normally reserved for hard centered confections.

An object of my invention is to provide a method for producing confections having uniform centers of predetermined consistency.

Another object of the invention is to provide a method for producing confections of a uniformly high quality, the method being adapted for use in mass production operations.

Another object of the invention is to provide a method for making a confectionery center which is soft or liquid at ordinary temperature, yet is firm and adapted for use in presently known methods of confectionery coating.

Another object of my invention is to provide a method for accurately controlling the consistency of the center of a confection.

Still another object is to provide a method for making a liquid or soft centered confection, in the nature of a cordial, that effects a substantial saving in time, cost, and labor over presently known methods.

Other objects will be apparent upon reading the accompanying discussion and disclosure.

According to my invention, powdered or finely ground ice is intimately mixed with the dry ingredients comprising the center of a confection, and the resulting mixture is pressed into individual centers of desired size and shape, the temperature being maintained below the melting point of the ice. The individual centers are then coated, for example with chocolate, by known means, after which the temperature of the center is allowed to rise above the melting point of the ice, thereby forming a liquid or soft center within the outer coating of the resulting confection.

The term ice, as used in this application, includes frozen dilute solutions of various confectionery ingredients such as flavoring, food acids, enzymes, invertase, and the like. It is often desirable to introduce these materials in the ice as they are generally utilized in small amounts and such practice insures equal distribution thereof throughout the center. A portion of the sugar utilized in the center can also be introduced in the ice. The amount of these ingredients which can be introduced into the mixture as a frozen solution varies widely and is primarily determined by the desired freezing temperature and/or freezing time of the resulting solution. I have found it desirable to limit the soluble ingredients so as to form a solution containing not more than 20 per cent by weight and preferably not more than 10 per cent by weight of soluble confectionery ingredients. It is understood however that a more concentrated solution can be used without departing from the method of my invention.

The degree of crushing or grinding of the ice can vary widely depending upon such factors as speed of melting desired, distribution of ice throughout the mixture, and the like. Generally speaking, the finer the ice is powdered or ground, the faster the ice melts and the more closely the quality and consistency of the center can be controlled. Those skilled in the art can determine the desired fineness for each case.

The dry ingredients mentioned above include all components of the confectionery center that are not added with the ice. These components include, but are not limited to, sugar, flavoring, food acids, enzymes, invertase, and the like. In any particular case it is clear that certain of the ingredients forming the center can either be added as a frozen solution or as dry ingredients or partially in the ice and partially as dry ingredients, it being within the skill of the art to determine the most desirable method for each case.

The pressing operation wherein the ice and dry ingredients are formed into individual centers can be carried out by known means. For example, I have found that a pill press can be used to form the individual centers which are subsequently coated to form a finished confection. It is clear that the centers can be pressed into any desired size and shape, the size and shape of the finished confection being the primary factor to be considered since the outer coating of the confection is applied to the individual centers during the coating operation, thereby establishing the size and shape of the finished confection. The same pressing machine can be used to form all centers by merely changing the mold to conform to the desired size and shape of the finished confection.

The temperature at which the method of my invention is carried out can vary widely, it being desired in all cases to maintain the temperature below the melting point of the ice so as to enable the center to be handled in presently known machines without sticking or losing its shape. Generally speaking, as more ingredients are added in solution with the water, the freezing point of the solution is depressed, thereby requiring a lower temperature and/or a longer time for freezing. Also more concentrated solutions require lower temperatures throughout the process. I have found it desirable to maintain the temperature below 10° F. even in the case of very dilute solutions, and that solutions having a freezing point as low as —30° F. can be economically utilized in the method of my invention. However it is clear that solutions having a lower freezing point can be used in the practice of my invention and that temperatures above 10° F. can be maintained, so long as the ice doesn't melt. It may be desirable in certain applications to quick-freeze the solution at a low temperature and then allow the temperature to rise to a point below the melting point of the ice during the subsequent mixing, pressing, and coating operations. This procedure is particularly desirable in cases where the solution freezes at a low temperature and the time required for freezing can be substantially reduced by lowering the temperature below the melting point by a wide margin during the freezing operation.

The consistency of the resulting confectionery center can be very accurately controlled by controlling the amount of ice mixed with the dry ingredients so as to form a center of desired consistency when the ice is allowed to melt. A center of high consistency can be made by utilizing a high ratio of dry ingredients to ice. Conversely a center of low consistency can be made by utilizing a low ratio of dry ingredients to ice so as to form a relatively soft or liquid center when the ice is allowed to melt. The ratio of dry ingredients to ice to be utilized in each case can be readily determined by those skilled in the art. It can be seen that confections having centers ranging in nature from a free flowing liquid to a very viscous chewy semi-solid, such as caramels, can be prepared by the practice of my invention utilizing known apparatus, and that the consistency of the centers can be accurately controlled in each case so as to produce confections having centers of uniform predetermined consistency. This is an important feature of my invention and is not possible by presently known methods of making confections.

The coating operation can be carried out with known apparatus, since the center formed by the method of my invention retains its shape and does not stick or adhere to the coating apparatus. In addition, the cold surface of the centers made by the method of my invention aid in the setting of the confectionery coating. In some cases, particularly if the finished center has a low viscosity, it is desirable to double coat the center.

The following example is included to more clearly illustrate the method of my invention.

*Example*

Cherry cordials were made according to the method of my invention utilizing the following recipe: 65 pounds of sugar, 35 pounds of water, 4 ounces of citric acid, 2 ounces of cherry flavoring, and 1 ounce of invertase.

The citric acid, cherry flavoring, and invertase were dissolved in water and the resulting solution was frozen at a temperature of 0° F. This temperature of 0° F. was maintained throughout the process. The ice thus formed was finely ground and combined with the sugar, the resulting combination being thoroughly agitated to insure intimate mixing of the ice and sugar. Individual centers, substantially hemispherical in shape, were then formed by passing the mixture through a pill press. These centers were then coated with chocolate by conventional means and the chocolate coating was allowed to set. When the chocolate coating had become sufficiently set, the temperature of the centers was allowed to rise to room temperature, thereby melting the ice and forming cherry cordials having centers of uniform consistency and quality.

It will be apparent upon reading the above description and discussion that many changes in regard to nature of ingredients, proportion of ingredients, temperature of operation, and the like can be made without departing from the spirit and scope of my invention; therefore, it is intended that the example be considered as illustrating rather than limiting my invention.

I claim:

1. A method for making a confection having a normally liquid center of predetermined and widely variable consistency, comprising, combining finely ground ice with the dry ingredients forming the center of the confection, the ratio of said dry ingredients to said ice being controlled so as to produce a center of predetermined consistency when the ice is allowed to melt, pressing the resulting mixture of ice and dry ingredients into a center of desired size and shape, coating said center so as to form the outer shell of the confection, maintaining the temperature below the melting point of the ice during the combining, pressing, and coating operations, and allowing the temperature to rise above the melting point of the ice after the shell has become set, thereby producing a confection having a center of predetermined consistency.

2. A method for making a confection having a normally liquid center of predetermined and widely variable consistency, comprising, combining finely ground ice with the dry ingredients forming the center of the confection, said ice containing from 0 to 20 per cent by weight of soluble confectionery ingredients, the ratio of said dry ingredients and said ice being controlled so as to produce a center of predetermined consistency when the ice is allowed to melt, thoroughly mixing the ice and dry ingredients to provide substantially equal distribution of the ice throughout the dry ingredients, pressing the resulting mixture of ice and dry ingredients into a center of desired size and shape, coating said center so as to form the outer shell of said confection, maintaining the temperature below the melting point of the ice during the combining, mixing, and pressing operations, and raising the temperature above the melting point of the ice after said shell has set, thereby producing a confection having a center of predetermined consistency.

PAUL E. SCHULTZ.

References Cited in the file of this patent

UNITED STATES PATENTS

| Number | Name | Date |
|---|---|---|
| 1,076,751 | Davidson | Oct. 28, 1913 |
| 2,133,586 | Stanger et al. | Oct. 18, 1938 |